(12) United States Patent
Goma et al.

(10) Patent No.: US 9,735,589 B2
(45) Date of Patent: Aug. 15, 2017

(54) POWER TRANSMISSION DEVICE AND POWER TRANSMISSION CONTROL METHOD

(71) Applicant: MURATA MANUFACTURING CO., LTD., Nagaokakyo-shi, Kyoto-Fu (JP)

(72) Inventors: Sinji Goma, Nagaokakyo (JP); Keiichi Ichikawa, Nagaokakyo (JP); Tsuyoshi Suesada, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 473 days.

(21) Appl. No.: 14/282,566

(22) Filed: May 20, 2014

(65) Prior Publication Data

US 2014/0253052 A1     Sep. 11, 2014

Related U.S. Application Data

(63) Continuation of application No. PCT/JP2012/075364, filed on Oct. 1, 2012.

(30) Foreign Application Priority Data

Nov. 24, 2011   (JP) ................................. 2011-256808

(51) Int. Cl.
*H02J 7/00*     (2006.01)
*H02J 5/00*     (2016.01)

(52) U.S. Cl.
CPC ............... *H02J 7/00* (2013.01); *H02J 5/005* (2013.01)

(58) Field of Classification Search
CPC .................................................... H02J 7/025

USPC .......................................................... 320/108
See application file for complete search history.

(56) References Cited

U.S. PATENT DOCUMENTS

| 8,274,254 B2 | 9/2012 | Kamijo et al. |
| 8,314,513 B2 | 11/2012 | Aoyama et al. |
| 2004/0212344 A1* | 10/2004 | Tamura ................ A61N 1/3975 320/114 |

(Continued)

FOREIGN PATENT DOCUMENTS

| CN | 1770047 A | 5/2006 |
| CN | 101803222 A | 8/2010 |

(Continued)

OTHER PUBLICATIONS

Written Opinion and International Search Report issued in PCT/JP202/075364, mailed on Dec. 11, 2012.

*Primary Examiner* — Richard Isla Rodas
*Assistant Examiner* — Johali Torres Ruiz
(74) *Attorney, Agent, or Firm* — Arent Fox LLP

(57) ABSTRACT

Power transmission device that causes a power supply circuit to supply a first voltage to a first active electrode when power transmission is performed, causes the power supply circuit to supply a second voltage that is lower than the first voltage to the first active electrode and causes power reception device detection means to perform frequency sweeping at a first time interval until the power reception device is mounted, or causes the power supply circuit to supply a third voltage that is lower than the first voltage to the first active electrode and causes the power reception device detection means to perform frequency sweeping at a second time interval that is longer than the first time interval until the power reception device is removed.

18 Claims, 11 Drawing Sheets

(56) References Cited

U.S. PATENT DOCUMENTS

| | | | |
|---|---|---|---|
| 2008/0157603 A1* | 7/2008 | Baarman | H02J 7/025 307/104 |
| 2008/0197804 A1* | 8/2008 | Onishi | H02J 7/025 320/108 |
| 2009/0278505 A1* | 11/2009 | Toya | H02J 7/025 320/152 |
| 2012/0038223 A1 | 2/2012 | Harakawa et al. | |
| 2012/0062174 A1* | 3/2012 | Kamata | H02J 7/025 320/108 |
| 2014/0103716 A1 | 4/2014 | Camurati et al. | |

FOREIGN PATENT DOCUMENTS

| | | |
|---|---|---|
| JP | 6-150079 A | 5/1994 |
| JP | H08-214405 A | 8/1996 |
| JP | 2006-230129 A | 8/2006 |
| JP | 2009-531009 A | 8/2009 |
| JP | 2010-193692 A | 9/2010 |
| JP | 2010-213414 A | 9/2010 |
| JP | 4725664 B2 | 7/2011 |

* cited by examiner

PRIOR ART

POWER TRANSMISSION DEVICE AND POWER TRANSMISSION CONTROL METHOD

CROSS REFERENCE TO RELATED APPLICATIONS

The present application is a continuation of PCT/JP2012/075364 filed Oct. 1, 2012, which claims priority to Japanese Patent Application No. 2011-256808, filed Nov. 24, 2011, the entire contents of each of which are incorporated herein by reference.

FIELD OF THE INVENTION

The present invention relates to a power transmission device and a power transmission control method for transmitting power without a physical connection by using electric field coupling. In particular, the present invention relates to a power transmission device and a power transmission control method that improve safety and reduce power consumption.

BACKGROUND OF THE INVENTION

In recent years, numerous electronic appliances that transmit power in a non-contact manner have been developed. In order to transmit power to an electronic appliance in a non-contact manner, a power transmission system is often adopted that employs a magnetic field coupling scheme in which a coil module is included in both a power transmission unit and power reception unit.

However, in such magnetic field coupling scheme, the amount of magnetic flux passing through each coil module is greatly affected by the electromotive power and, in order to transmit power with high efficiency, high accuracy is needed in the control of the relative positions in a planar direction of the coil of the coil module on the power transmission unit side (primary side) and the coil of the coil module on the power reception unit side (secondary side). In addition, since coil modules are used as coupling electrodes, it is difficult to reduce the size of the power transmission unit and the power reception unit. Moreover, in electronic appliances such as portable appliances, there have also been issues in that it has been necessary to consider the effect that heat generated by the coil will have on the secondary battery and there is a risk that there will be a bottleneck from the viewpoint of layout design.

Accordingly, for example, power transmission systems have been developed that employ an electrostatic field. In Patent Document 1, an energy conveyance system is disclosed in which high power transmission efficiency is realized by forming a strong electric field between a coupling electrode of a power transmission unit and a coupling electrode of a power reception unit. FIG. 10 is a schematic diagram that illustrates the configuration of a power transmission system of the related art. As illustrated in FIG. 10, the power transmission system of the related art includes a large passive electrode 3 and a small active electrode 4 on a power transmission unit (power transmission device) 1 side and includes a large passive electrode 5 and a small active electrode 6 on a power reception unit (power reception device) 2 side. The active electrode 4 on the power transmission unit 1 side and the active electrode 6 on the power reception unit 2 side face each other and a strong electric field 7 is formed therebetween, whereby high power transmission efficiency is realized.

In addition, in Patent Documents 2 and 3, a method of detecting a foreign substance on the basis of changes in transmitted power in an magnetic field coupling scheme power transmission system in which a coil module is provided in both a power transmission unit (power transmission device) and a power reception unit (power reception device) is disclosed and in Patent Document 3 a power transmission control flow is disclosed in which communication is performed between a power transmission unit and a power reception unit.

Patent Document 1: Japanese Unexamined Patent Application Publication (Translation of PCT application) No. 2009-531009

Patent Document 2: Japanese Unexamined Patent Application Publication No. 2010-213414

Patent Document 3: Japanese Patent No. 4725664

In the power transmission system of the related art, changes in the voltage at the electrode are monitored by the power transmission unit and in the case where an abnormal change occurs, transmission control to stop transmission of power is generally performed. However, there has been a problem when transmitting power using an electric field coupling scheme in that it is difficult to ensure safety with respect the high electric field generated between the electrodes.

In addition, there has been another problem in that standby power consumption is large even when no power reception unit is mounted on the power transmission unit due to voltage changes at the electrode being monitored by the power transmission unit.

SUMMARY OF THE INVENTION

The present invention has been made in light of such circumstances and an object of the present invention is to provide a power transmission device and a power transmission control method that are capable of reducing standby power consumption when no power reception device is mounted while improving safety.

In order to achieve this object, provided is a power transmission device according to the present invention having a first passive electrode and a first active electrode. The first active electrode and a second active electrode of a power reception device are made to face each other with a space therebetween so as to be capacitively coupled with each other, and the first passive electrode and a second passive electrode of the power reception device are made to face each other so as to be capacitively coupled with each other. The power transmission device transmits power in a noncontact manner by forming a stronger electric field between the first active electrode and the second active electrode than between the first passive electrode and the second passive electrode. The power transmission device includes a power supply circuit that supplies power, power reception device detection means that detects whether the power reception device is mounted, charging state monitoring means that monitors a charging state of the power reception device, and power transmission control means that controls output of the power supply circuit in accordance with the charging state. The power transmission control means controls output of the power supply circuit so as to (1) cause the power supply circuit to supply a first voltage to the first active electrode when power transmission is performed, (2) cause the power supply circuit to supply a second voltage, which is lower than the first voltage, to the first active electrode and cause the power reception device detection means to perform frequency sweeping at a first time interval until the power reception device is mounted and (3) cause the power supply circuit to supply a third voltage, which is lower than the first voltage, to the first active electrode and cause the power reception device detection means to perform frequency sweeping at a second time interval, which is longer than the first time interval, until the power reception device is removed.

With the above-described configuration, the power supply circuit supplies the first voltage to the first active electrode when power transmission is performed, the power supply circuit supplies the second voltage that is lower than the first voltage to the first active electrode and the power reception device detection means performs frequency sweeping at the first time interval until the power reception device is mounted when detection of whether the power reception device is mounted is being performed, and the power supply circuit supplies the third voltage that is lower than the first voltage to the first active electrode and the power reception device detection means performs frequency sweeping at the second time interval which is longer than the first time interval until the power reception device is removed when determination of whether charging is complete is being performed. Thus, at times other than when power is being transmitted, the voltage supplied to the first active electrode can be reduced and therefore power consumption can be reduced. In addition, in the case where the power reception device is not mounted, a voltage supplied to the first active electrode is low and therefore dangers such as conduction of a current occurring due to something contacting the power transmission device can be avoided and a safe power transmission device can be provided.

In addition, in the power transmission device according to the present invention, it is preferable that the power reception device detection means includes mounting determination means that measures frequency characteristics of a voltage by performing frequency sweeping in a predetermined frequency range and determines that the power reception device is mounted upon detecting a frequency at which the voltage has a maximum value.

With this configuration, when determination of whether the power reception device is mounted is being performed, frequency characteristics of the voltage are measured by performing frequency sweeping in a predetermined frequency range and it is determined that the power reception device is mounted when a frequency is detected at which the voltage has a maximum value. In the case where the power reception device is mounted, because each type of power reception device generates a characteristic resonant frequency, it is possible to determine whether a desired power reception device is mounted with certainty even in the case where identification information that identifies the power reception device is not obtained.

In addition, in the power transmission device according to the present invention, it is preferable that the charging state monitoring means include determination means that monitors a current output to the first passive electrode and the first active electrode and determines whether charging has been completed on the basis of the current.

With the above-described configuration, the current output to the first passive electrode and the first active electrode is monitored and whether charging has been completed can be determined on the basis of the current and therefore the charging state of the power reception device can be grasped on the power transmission device side without performing special data communication with the power reception device.

In addition, it is preferable that the power transmission device according to the present invention further include recognition means that, in a case where the power reception device detection means has detected that the power reception device is mounted, recognizes whether the power reception device is a power reception device that is a target to which power is to be transmitted, and that the power transmission control means set a frequency sampling interval used when performing frequency sweeping until a recognition result is output by the recognition means to be shorter than a frequency sampling interval used when performing frequency sweeping to determine whether the power reception device is mounted.

With this configuration, in the case where it has been detected that the power reception device is mounted, because the frequency sampling interval used when performing frequency sweeping to recognize whether the power reception device is a power reception device that is a target to which power is to be transmitted until a recognition result is output is set to be shorter than a frequency sampling interval that is used when performing frequency sweeping to determine whether the power reception device is mounted, it is possible to determine whether the resonant frequency is within a range assumed by the power reception device that is a target to which power is to be transmitted with higher precision.

In addition, in the power transmission device according to the present invention, it is preferable that the power transmission control means cause the power supply circuit to supply a fourth voltage, which is lower than the second voltage, to the first active electrode, and that the recognition means recognize that the power reception device is a target to which power is to be transmitted upon obtaining identification information that identifies the power reception device through communication of data with the power reception device.

With this configuration, because the power reception device is recognized as being the target to which power is to be transmitted in the case where identification information that identifies the power reception device is obtained by supplying the fourth voltage that is lower than the second voltage to the first active electrode and performing data communication with the power reception device, the type of the mounted power reception device can be grasped from the identification information that is characteristic to the power reception device and power can be transmitted to a plurality of power reception devices of different types using just one power transmission device.

In addition, in the power transmission device according to the present invention, it is preferable that the charging state monitoring means monitor a magnitude relation between the current, a first threshold and a second threshold that is smaller than the first threshold, and that the determination means determine that an abnormality has occurred in the case where the current is determined to be larger than the first threshold and determine that charging has been completed in the case where the current is determined to be smaller than the second threshold.

With this configuration, the magnitude relation between the current, the first threshold and the second threshold that is smaller than the first threshold is monitored, and in the case where it is determined that the current is larger than the first threshold it is determined that some abnormality has occurred and in the case where it is determined that the current is smaller than the second threshold it is determined that charging has been completed, and therefore the occurrence of an abnormality and the charging state of the power reception device can be grasped on the power transmission device side without performing special data communication with the power reception device.

In addition, in the power transmission device according to the present invention, it is preferable that the power transmission control means obtain a parameter that is necessary for power reception for the power reception device by performing data communication with the power reception device by using a load modulation method and then specify a frequency to be used when transmitting power on the basis of the obtained parameter.

With this configuration, a parameter necessary for power reception for a specific power reception device is obtained by performing data communication with the power reception device by using a load modulation method and the frequency to be used when transmitting power is specified on the basis of the obtained parameter, and therefore, even in the case where power is to be transmitted to a plurality of power reception devices of different types by using just one power transmission device, a frequency can be specified that is appropriate for power transmission to each of the power reception devices and therefore power can be efficiently transmitted.

Next, in order to achieve the above-described object, provided is a power transmission control method according to the present invention in which a power transmission device having a first passive electrode and a first active electrode and a power reception device having a second passive electrode and a second active electrode are used. The first active electrode and the second active electrode are made to face each other with a space therebetween so as to be capacitively coupled with each other, and the first passive electrode and the second passive electrode are made to face each other so as to be capacitively coupled with each other. Power is transmitted in a noncontact manner by forming a stronger electric field between the first active electrode and the second active electrode than between the first passive electrode and the second passive electrode. The power transmission device detects whether the power reception device is mounted, monitors a charging state of the power reception device and controls output of the power supply circuit that supplies power in accordance with the charging state such that the following occurs. (1) The power supply circuit supplies a first voltage to the first active electrode when power transmission is performed. (2) The power supply circuit supplies a second voltage, which is lower than the first voltage, to the first active electrode and the power transmission device performs frequency sweeping at a first time interval until the power reception device is mounted. (3) The power supply circuit supplies a third voltage, which is lower than the first voltage, to the first active electrode and the power transmission device performs frequency sweeping at a second time interval, which is longer than the first time interval, until the power reception device is removed.

With the above-described configuration, the power supply circuit supplies the first voltage to the first active electrode when power transmission is performed, the power supply circuit supplies the second voltage that is lower than the first voltage to the first active electrode and the power transmission device performs frequency sweeping at the first time interval until the power reception device is mounted when detection of whether the power reception device is mounted is being performed, and the power supply circuit supplies the third voltage that is lower than the first voltage to the first active electrode and the power transmission device performs frequency sweeping at the second time interval which is longer than the first time interval until the power reception device is removed when determination of whether charging has been completed is being performed. Thus, at times other than when power is being transmitted, the voltage supplied to the first active electrode can be reduced and therefore power consumption can be reduced. In addition, in the case where the power reception device is not mounted, a voltage supplied to the first active electrode is low and therefore dangers such as conduction of a current occurring due to something contacting the power transmission device can be avoided and a safe power transmission device can be provided.

In addition, in the power transmission control method according to the present invention, it is preferable that the power transmission device measure frequency characteristics of a voltage by performing frequency sweeping in a predetermined frequency range and determine that the power reception device is mounted upon detecting a frequency at which the voltage has a maximum value.

With this configuration, when determining whether the power reception device is mounted, the power transmission device measures frequency characteristics of the voltage by performing frequency sweeping in a predetermined frequency range and determines that the power reception device is mounted upon detecting a frequency at which the voltage has a maximum value. In the case where the power reception device is mounted, because each type of power reception device generates a characteristic resonant frequency, it is possible to determine whether a desired power reception device is mounted with certainty even in the case where identification information that identifies the power reception device is not obtained.

In addition, in the power transmission control method according to the present invention, it is preferable that the power transmission device monitor a current output to the first passive electrode and the first active electrode, and determine whether charging has been completed on the basis of the current.

With the above-described configuration, the power transmission device monitors the current output to the first passive electrode and the first active electrode and can determine whether charging has been completed on the basis of the current and therefore the charging state of the power reception device can be grasped on the power transmission device side without performing special data communication with the power reception device.

In addition, in the power transmission control method according to the present invention, it is preferable that, in a case where the power transmission device has detected that the power reception device is mounted, the power transmission device recognize whether the power reception device is a power reception device that is a target to which power is to be transmitted, and that the power transmission device set a frequency sampling interval used when performing frequency sweeping until a recognition result is output to be shorter than a frequency sampling interval used when performing frequency sweeping to determine whether the power reception device is mounted.

With this configuration, in the case where it has been detected that the power reception device is mounted, because the power transmission device recognizes whether the power reception device is a power reception device that is a target to which power is to be transmitted and the power transmission device sets the frequency sampling interval used when performing frequency sweeping until a recognition result is output to be shorter than a frequency sampling interval that is used when performing frequency sweeping to determine whether the power reception device is mounted, it is possible to determine whether the resonant frequency is within a range assumed by the power reception device that is a target to which power is to be transmitted with higher precision.

In addition, in the power transmission control method according to the present invention, it is preferable that the power supply circuit supply a fourth voltage, which is lower than the second voltage, to the first active electrode, and that the power transmission device recognize that the power reception device is a target to which power is to be transmitted upon obtaining identification information that identifies the power reception device through communication of data with the power reception device.

With this configuration, because the power reception device is recognized as being the target to which power is to be transmitted in the case where identification information that identifies the power reception device is obtained by supplying the fourth voltage that is lower than the second voltage to the first active electrode and performing data communication with the power reception device, the type of the mounted power reception device can be grasped from the identification information that is characteristic to the power reception device and power can be transmitted to a plurality of power reception devices of different types using just one power transmission device.

In addition, in the power transmission control method according to the present invention, it is preferable that the power transmission device monitor a magnitude relation between the current, a first threshold and a second threshold that is smaller than the first threshold, and that the power transmission device determine that an abnormality has occurred in the case where the current is determined to be larger than the first threshold and determine that charging is complete in the case where the current is determined to be smaller than the second threshold.

With this configuration, the magnitude relation between the current, the first threshold and the second threshold that is smaller than the first threshold is monitored, and in the case where it is judged that the current is larger than the first threshold it is determined that some abnormality has occurred and in the case where it is judged that the current is smaller than the second threshold it is determined that charging has been completed, and therefore the occurrence of an abnormality and the charging state of the power reception device can be grasped on the power transmission device side without performing special data communication with the power reception device.

In addition, in the power transmission control method according to the present invention, it is preferable that the power transmission device obtain a parameter that is necessary for power reception for the specific power reception device by communicating data with the power reception device by using a load modulation method and then specify a frequency to be used when transmitting power on the basis of the obtained parameter.

With this configuration, the power transmission device obtains a parameter necessary for power reception for a specific power reception device by performing data communication with the power reception device by using a load modulation method and specifies the frequency to be used when transmitting power on the basis of the obtained parameter, and therefore, even in the case where power is to be transmitted to a plurality of power reception devices of different types by using just one power transmission device, a frequency that is appropriate for power transmission to each of the power reception devices can be specified and therefore power can be efficiently transmitted.

With the power transmission device and the power transmission control method according to the present invention, the power supply circuit supplies the first voltage to the first active electrode when power transmission is performed, the power supply circuit supplies the second voltage that is lower than the first voltage to the first active electrode and the power transmission device (power reception device detection means) performs frequency sweeping at the first time interval until the power reception device is mounted when detection of whether the power reception device is mounted is being performed, and the power supply circuit supplies the second voltage that is lower than the first voltage to the first active electrode and the power transmission device (power reception device detection means) performs frequency sweeping at the second time interval, which is longer than the first time interval, until the power reception device is removed when determination of whether charging has been completed is being performed. Thus, at times other than when power is being transmitted, the voltage supplied to the first active electrode can be reduced and therefore power consumption can be reduced. In addition, in the case where no power reception device is mounted, a voltage supplied to the first active electrode is low and therefore dangers such as conduction of a current occurring due to something contacting the power transmission device can be avoided and a safe power transmission device and power transmission control method can be provided.

DETAILED DESCRIPTION OF THE PREFERRED EMBODIMENTS

Hereafter, a power transmission system that employs a power transmission device of an embodiment of the present invention will be concretely described using the drawings. It should go without saying that the following embodiments do not limit the invention described in the claims and all of the combinations of characteristic matters described in the embodiments are not necessarily required as means for solving the problem.

Embodiment 1

Figure 1:
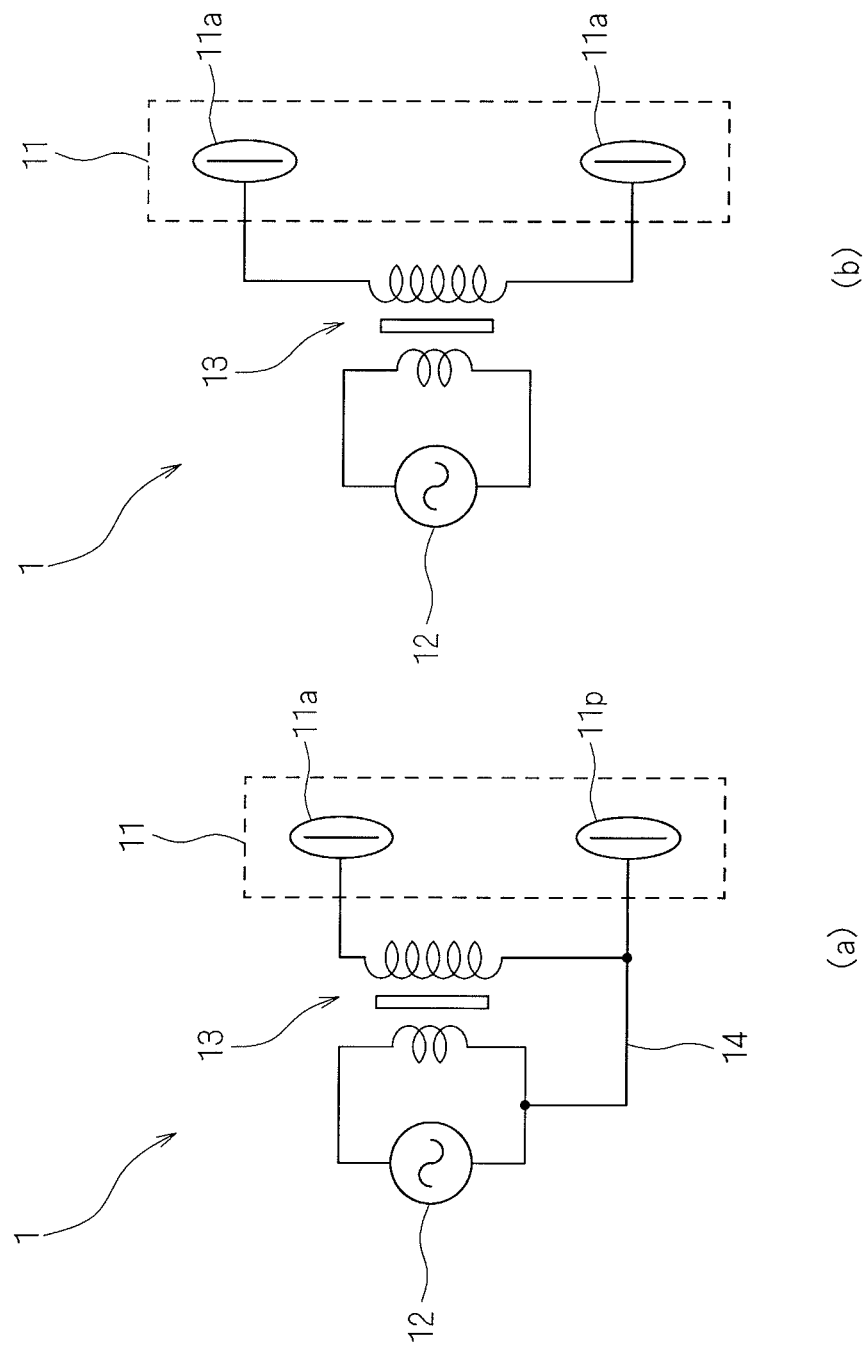
FIG. 1 is a circuit diagram schematically illustrating configurations of a power transmission device according to embodiment 1 of the present invention.

FIG. 1 is a circuit diagram schematically illustrating a configuration of a power transmission device according to embodiment 1 of the present invention. As illustrated in FIG. 1(a), a power transmission device 1 according to embodiment 1 at least includes a high-frequency generator circuit (power supply circuit) 12, a step up transformer 13, and first coupling electrodes 11 composed of a first active electrode 11a and a first passive electrode 11p. In the circuit of FIG. 1(a), when a voltage is stepped up by the step up transformer 13, the first active electrode 11a is at a high-voltage and the first passive electrode 1ip is at a low voltage.

As illustrated in FIG. 1(b), a ground wire 14 illustrated in FIG. 1(a) is not necessarily required. In the case where a voltage is stepped up by the step up transformer 13 without the ground wire 14 being provided, the first coupling electrodes 11 are both at a high-voltage and this is equivalent to a plurality of first active electrodes 11a being connected. Hereafter, description will be given using the configuration of FIG. 1(a), but it goes without saying that the same description would apply to the configuration of FIG. 1(b) from the viewpoint of the positioning of the first coupling electrodes 11. In the configuration of FIG. 1(b), the power transmission device 1 is provided with two first active electrodes 11a and a corresponding power reception device is also provided with two active electrodes.

Figure 2A:
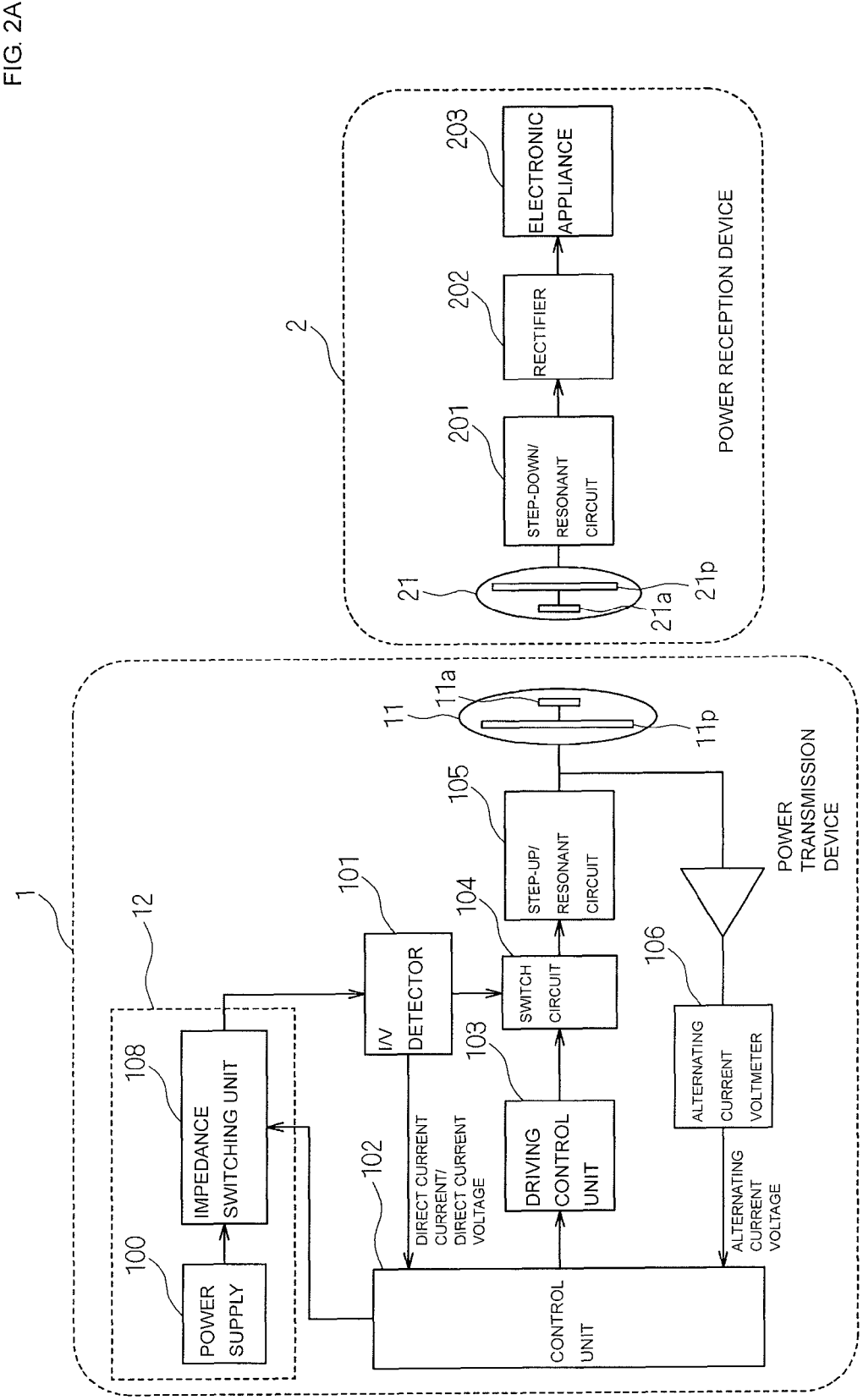
FIG. 2A is a block diagram schematically illustrating a configuration of a power transmission system that employs the power transmission device according to embodiment 1 of the present invention.
Figure 2B:
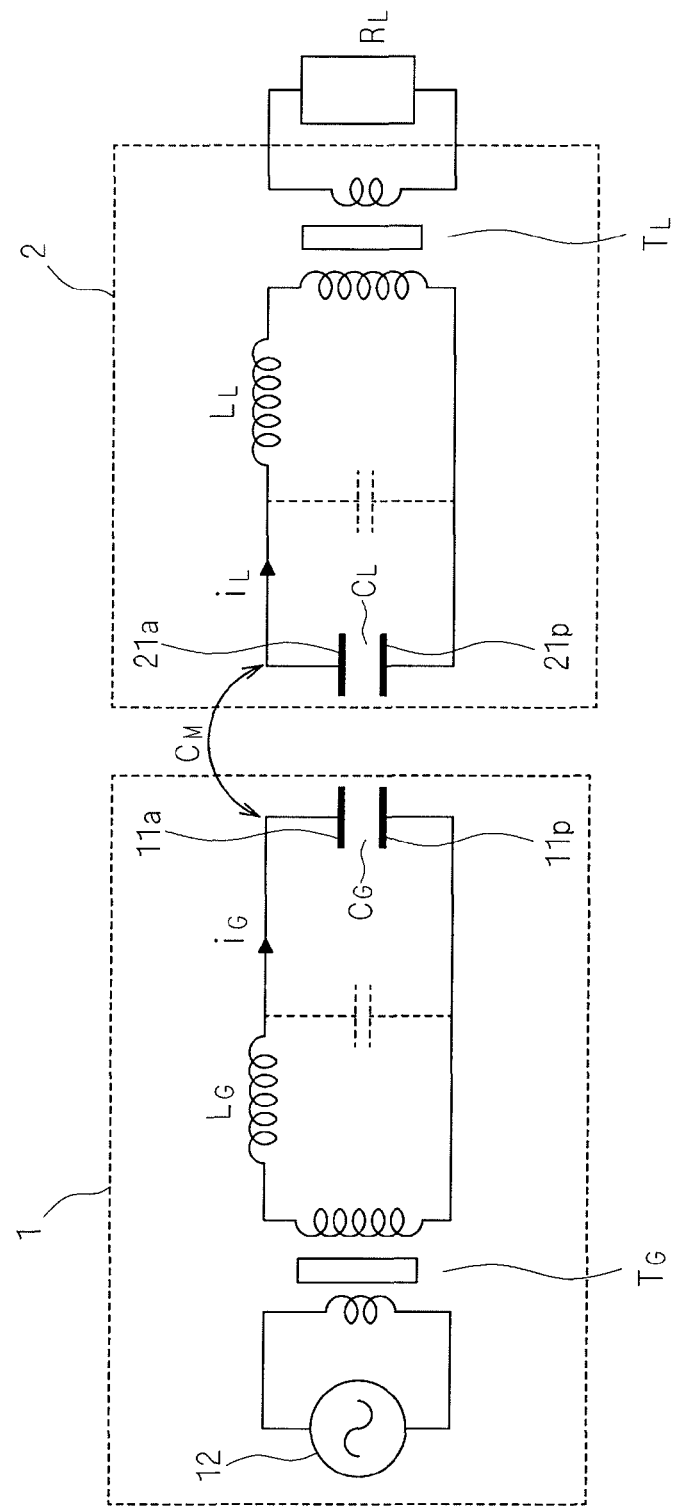
FIG. 2B is an equivalent circuit diagram of the power transmission system that employs the power transmission device 1 according to embodiment 1 of the present invention.

FIG. 2A is a block diagram schematically illustrating a configuration of a power transmission system that employs the power transmission device 1 according to embodiment 1 of the present invention. FIG. 2B is an equivalent circuit diagram of the power transmission system that employs the power transmission device 1 according to embodiment 1 of the present invention. As illustrated in FIG. 2A and FIG. 2B, a power supply 100 supplies a fixed direct current voltage (for example, DC 5 V) and the voltage is adjusted using a high-frequency voltage of for example 100 kHz to several tens of Mhz by an impedance switching unit 108. A power supply circuit 12 is formed of the power supply 100 and the impedance switching unit 108. A step-up/resonant circuit 105 is formed of a step-up transformer TG and an inductor LG and steps up a high-frequency voltage and supplies the stepped-up high-frequency voltage to the first active electrode 11a. A capacitance CG represents the capacitance between the passive electrode 1ip and the active electrode 11a. A series resonant circuit is formed of an inductor LG and the capacitance CG. An I/V detector 101 detects a direct current voltage value DCV and a direct current value DCI supplied from the power supply circuit 12 and passes the detected voltage and current to a control unit 102. The control unit 102 transmits instructions to the impedance switching unit 108 and a driving control unit 103 on the basis of outputs of the I/V detector 101 and an alternating-current voltmeter 106, which will be described below (power transmission control means).

The control unit 102 obtains the direct current voltage value DCV detected by the I/V detector 101 and analyzes the frequency characteristics of the obtained direct current voltage value DCV and detects whether a power reception device 2 is mounted (power reception device detection means). At this time, the control unit 102 transmits an instruction to the impedance switching unit 108 instructing that a comparatively low voltage (second voltage) be supplied to the first active electrode 11a. The impedance switching unit 108 adjusts the magnitude of the direct-current voltage supplied from the power supply 100 in accordance with the instruction from the control unit 102. In addition, the control unit 102 performs frequency sweeping at a fixed time interval (first time interval) until the power reception device 2 is mounted.

In a state where the power reception device 2 is not mounted, a maximum value of the direct current voltage value DCV does not occur because a resonant frequency does not occur when frequency sweeping is being performed. That is, the change in the direct current voltage in per unit time period is not larger than a predetermined value.

On the other hand, in the case where the power reception device 2 is mounted, a resonant frequency that is characteristic to the type of the mounted power reception device 2 does occur and a maximum value of the direct current voltage value DCV does occur in the vicinity of that resonant frequency. When the control unit 102 detects a frequency at which the direct current voltage value DCV has a maximum value, the control unit 102 determines that the power reception device 2 is mounted (mounting determination means). Since there is a frequency at which the change in the direct-current voltage per unit time becomes larger than the predetermined value, this frequency can be detected and set as an operation frequency to be used when performing power transmission.

In addition, the control unit 102 obtains an alternating-current voltage value ACV detected by the alternating-current voltmeter 106 and monitors a current obtained by converting the obtained alternating-current voltage value ACV (charging state monitoring means). Then, whether charging has been completed is determined on the basis of the current obtained through the conversion (determination means). More specifically, in the case where the current has become smaller than a second threshold, it is determined that charging has been completed, and in the case where the current has become larger than a first threshold, which is larger than the second threshold, it is determined that some abnormality has occurred.

The alternating-current voltmeter 106 detects an output voltage of the step-up/resonant circuit 105, that is, detects a voltage stepped up by the step-up/resonant circuit 105. The control unit 102 determines whether an overvoltage state exists in which the alternating-current voltage value ACV detected by the alternating-current voltmeter 106 has exceeded a fixed voltage. In the case where the control unit 102 determines that an overvoltage states in which the alternating-current voltage value ACV has exceeded a fixed voltage exists, the control unit 102 stops transmission of power by transmitting a power transmission stoppage instruction to the driving control unit 103.

Figure 3:
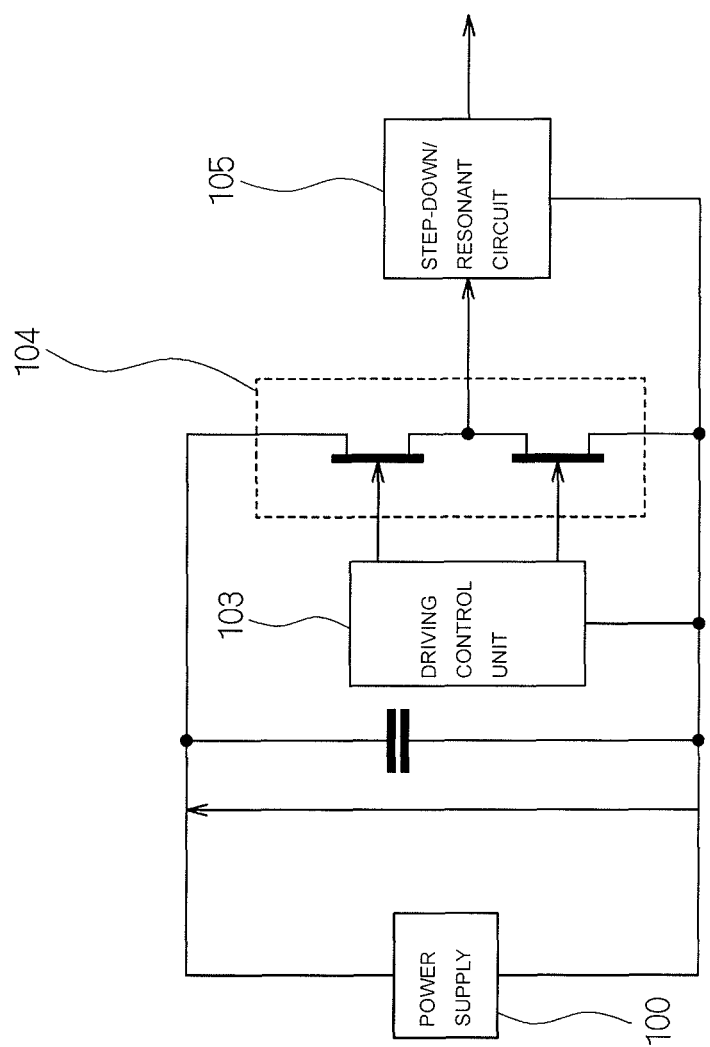
FIG. 3 is a schematic diagram illustrating a configuration of a switch circuit.

The control unit 102 transmits power transmission initiation and stoppage instructions to the driving control unit 103, and the driving control unit 103 makes a switch circuit 104 convert a direct-current into an alternating-current. FIG. 3 is a schematic diagram illustrating the configuration of the switch circuit 104. As illustrated in FIG. 3, the switch circuit 104 is formed of a pair of FETs and supplies an alternating-current current obtained by conversion to the step-up/resonant circuit 105 in accordance with an output of the driving control unit 103.

Returning to FIG. 2A and FIG. 2B, the step up/resonant circuit 105 steps up a voltage of the first coupling electrodes 11 (first active electrode 11*a* and first passive electrode 11*p*). The first active electrode 11*a* of the power transmission device 1 and the second active electrode 21*a* of the power reception device 2 face each other with a gap therebetween and are as a result capacitively coupled with each other and the first passive electrode lip of the power transmission device 1 and the second passive electrode 21*p* of the power reception device 2 face each other with a gap therebetween and are as a result capacitively coupled with each other, and thereby power is transmitted from the power transmission device 1 to the power reception device 2. A step-down/resonant circuit 201, which is formed of a stepdown transformer TL and an inductor LL, is connected to the second coupling electrodes 21 of the power reception device 2 to which power is transmitted. The voltage is stepped down by the step-down/resonant circuit 201, is rectified by a rectifier 202 so as to meet the specifications of a connected portable electronic appliance (mobile appliance) 203 and charging of the electronic appliance 203 is started.

A capacitance CL represents the capacitance between the passive electrode 21*p* and the active electrode 21*a*. A parallel resonant circuit is formed by the inductor LL and the capacitance CL, and this parallel resonant circuit has a characteristic resonant frequency. A capacitance CM represents a capacitance between the first coupling electrodes 11 and the second coupling electrodes 21 when the first coupling electrodes 11 and the second coupling electrodes 21 are capacitively coupled with one another.

In addition, in the above-described embodiment, a configuration has been described in which active electrodes and passive electrodes of the power transmission device 1 and the power reception device 2 face one another with gaps therebetween, but the present invention is not particularly limited to this configuration and it is sufficient that active electrodes and passive electrodes that face one another are capacitively coupled with one another with a gap therebetween. For example, a configuration may be adopted in which the active electrodes and the passive electrodes are not in direct conductive contact with each other as a result of arranging a substance that insulates the active electrodes or the passive electrodes from each other such as a dielectric, an insulating liquid, or a gas, such as a plastic that forms the device casings between the active electrodes and the passive electrodes, or a combination of a plurality of such materials.

Figure 4:
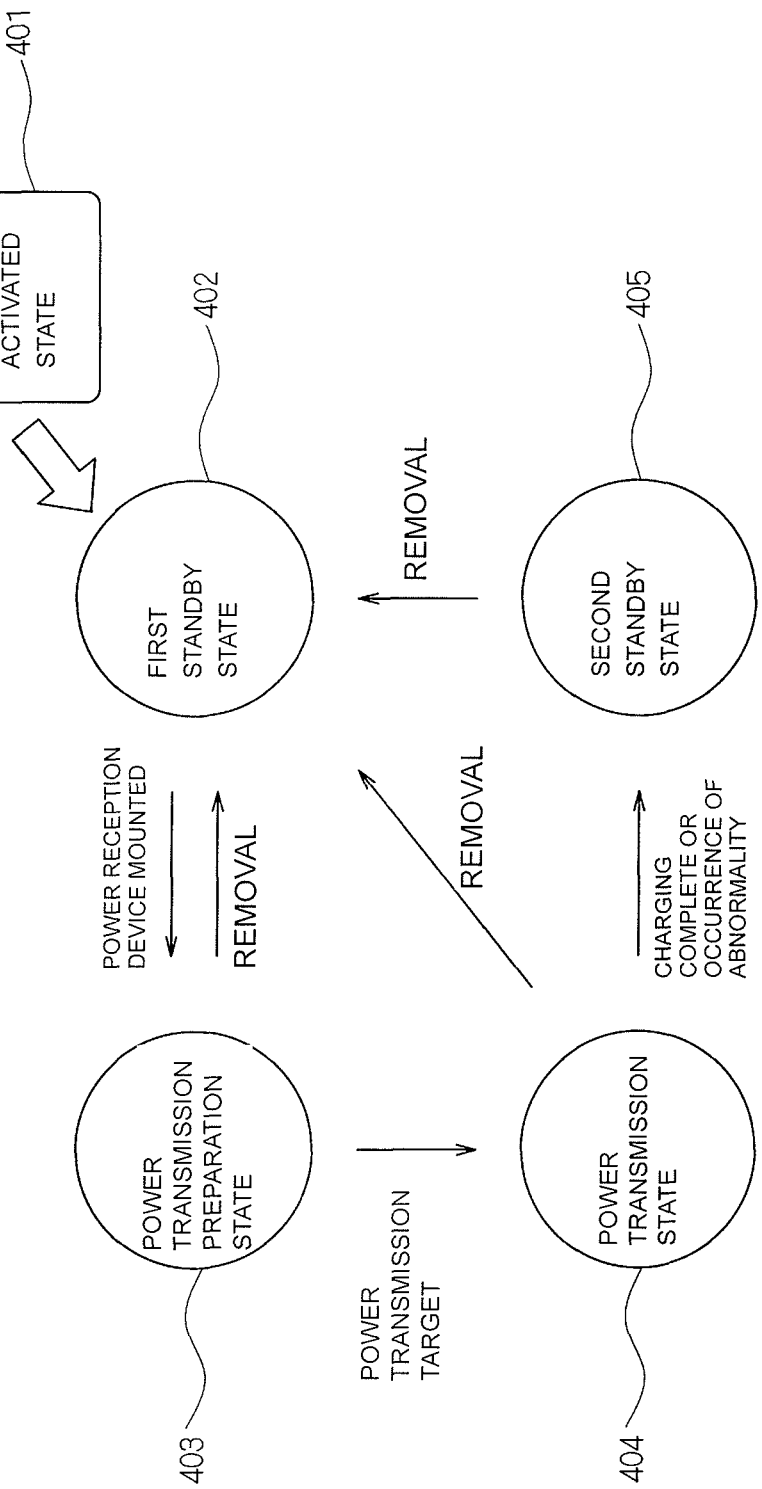
FIG. 4 is a schematic diagram illustrating state transitions of the power transmission device according to embodiment 1 of the present invention.

Next, state transitions of the power transmission device 1 in the power transmission system having the above-described configuration will be described. FIG. 4 is a schematic diagram illustrating state transitions of the power transmission device 1 according to embodiment 1 of the present invention.

As illustrated in FIG. 4, the power transmission device 1 is activated by for example being plugged into a wall socket or being connected to an A/C adapter (activated state 401). The power transmission device 1 transitions to a first standby state 402 immediately after being activated. In the first standby state 402, the control unit 102 reduces the power supplied from the power supply 100 by transmitting a high impedance setting instruction to the impedance switching unit 108 such that a comparatively low voltage (second voltage) is supplied to the first active electrode 11*a*.

The control unit 102 obtains a direct current voltage value DCV detected by the I/V detector 101 and determines whether a resonant frequency has occurred by performing frequency sweeping at a fixed time interval (first time interval) (mounting determination means). Since the resonant frequency does not occur in a state where the power reception device 2 is not mounted, a state of waiting continues until a resonant frequency occurs, that is, until the power reception device 2 is mounted. In the case where the control unit 102 determines that a resonant frequency has occurred, the control unit 102 determines that the power reception device 2 has been mounted and transitions the power transmission device 1 to a power transmission preparation state 403 from the first standby state 402.

Figure 5:
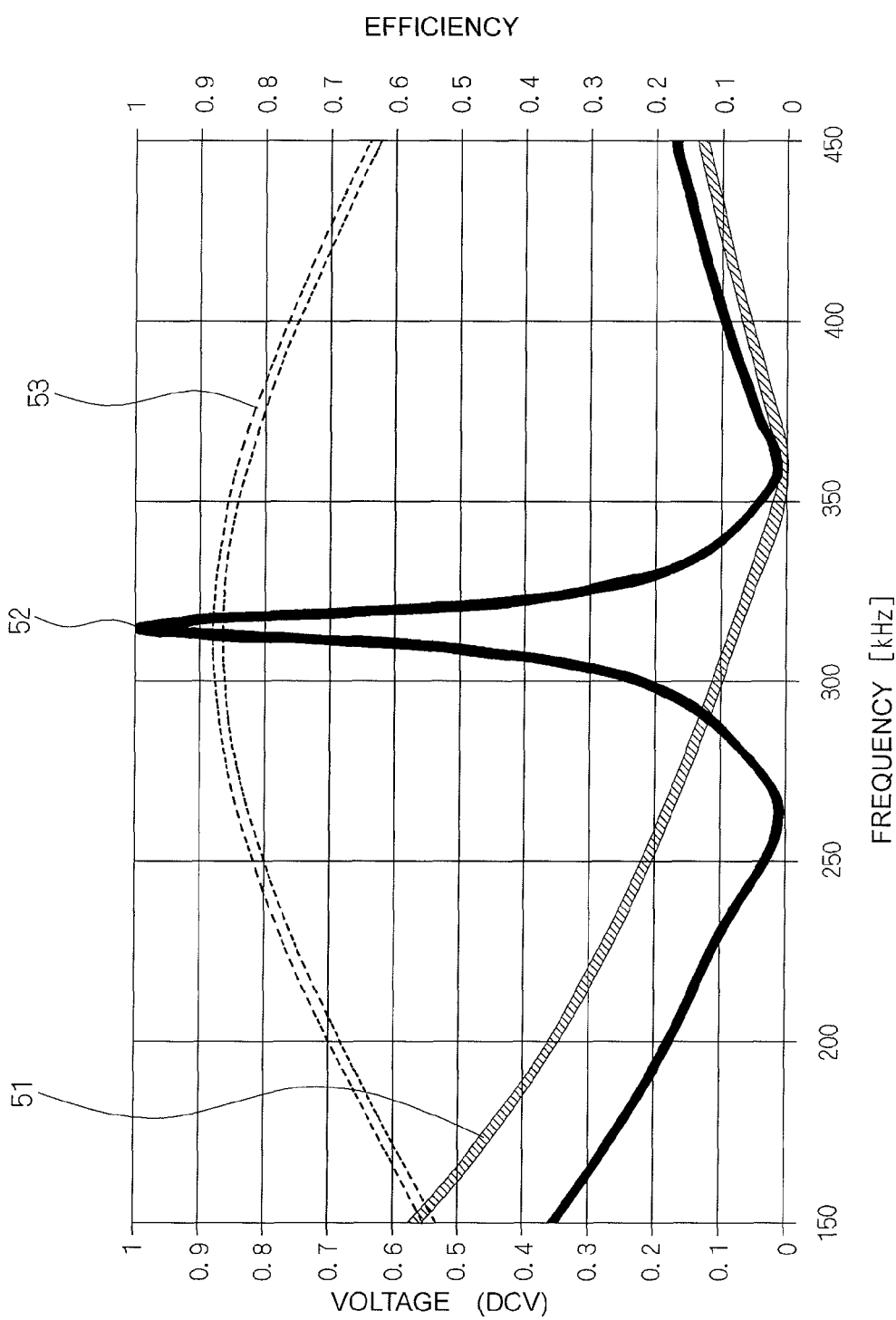
FIG. 5 illustrates an example of a direct-current voltage detected by an I/V detector of the power transmission device according to embodiment 1 of the present invention.

FIG. 5 illustrates an example of changes in a direct current voltage value DCV detected by the I/V detector 101 of the power transmission device 1 according to embodiment 1 of the present invention. In FIG. 5, the horizontal axis represents the swept frequency and the vertical axes represent the detected direct current voltage value DCV and the transmission efficiency.

A characteristic (frequency characteristic) 51 of FIG. 5 represents the change in the direct current voltage value DCV in the case where the power reception device 2 is not mounted. As is clear from the characteristic 51, in the case where the power reception device 2 is not mounted, a resonant frequency does not occur and a maximum value of the direct current voltage value DCV does not occur.

On the other hand, a characteristic (frequency characteristic) 52 represents the change in the direct current voltage value DCV in the case where the power reception device 2 is mounted. As is clear from the characteristic 52, in the case where the power reception device 2 is mounted, a resonant frequency does occur and a maximum value of the direct current voltage value DCV does occur. As is clear from the transmission efficiency 53, the efficiency of transmission of power is highest in the vicinity of the frequency at which the direct current voltage value DCV has a maximum value and therefore the operation frequency to be used when transmitting power is set to be the frequency at which the direct current voltage value DCV has a maximum value, whereby transmission of power can be performed at a frequency at which the efficiency of transmission of power is highest.

Returning to FIG. 4, in the power transmission preparation state 403, having determined that a resonant frequency has occurred, the control unit 102 then determines whether this is due to a simple erroneous operation, due to connection of an electronic appliance that is assumed not to be a charging target to the power reception device 2, or due to the electronic appliance 203 which is the target of charging being connected to the power reception device 2. That is, it is recognized whether the mounted power reception device 2 is the power reception device 2 that is a target to which power is to be transmitted (recognition means). Specifically, it can be determined whether the frequency at which the direct current voltage value DCV has a maximum value lies within a range assumed by the electronic appliance 203 which is the target of charging.

In the case where it is determined that the determination was due to a simple erroneous operation or connection of an electronic appliance assumed not to be a target of charging, a state of waiting in the power transmission preparation state 403 continues until the power reception device 2, to which the electronic appliance 203 which is a target of charging is connected, is mounted. In addition, similarly to as in the first standby state 402, the control unit 102 obtains a direct current voltage value DCV detected by the I/V detector 101 and determines whether a resonant frequency has occurred by performing frequency sweeping at a fixed time interval, and in the case where it is determined that a resonant frequency has not occurred, it is determined that an electronic appliance that has generated an erroneous operation, an electronic appliance that is assumed not to be a target of charging or the electronic appliance 203 that is a target of charging has been removed from the power reception device 2 or it is determined that the power reception device 2 itself has been removed and the control unit 102 transitions the power transmission device 1 to the first standby state 402 once again. The frequency sampling interval used when performing frequency sweeping is preferably set so as to be shorter than a frequency sampling interval in the first standby state 402. This is because it is necessary to recognize whether the mounted power reception device 2 is the power reception device 2 to which the electronic appliance 203 that is a target of charging is connected with high accuracy (recognition means).

In the case where the control unit 102 determines that the power reception device 2 that is the target of power transmission is mounted, that is, determines that the power reception device 2, to which the electronic appliance 203 that is a target of charging is connected, is mounted, the control unit 102 transitions the power transmission device 1 to a power transmission state 404 and initiates transmission of power to the power reception device 2. Specifically, the control unit 102 causes power supplied from the power supply 100 to be increased by transmitting a low impedance setting instruction to the impedance switching unit 108 such that a comparatively high voltage (first voltage) is supplied to the first active electrode 11a and transmits a power transmission initiation instruction to the driving control unit 103.

In the power transmission state 404 as well, similarly to as in the first standby state 402, the control unit 102 obtains a direct current voltage value DCV detected by the I/V detector 101 and determines whether a resonant frequency has occurred by performing frequency sweeping at a fixed time interval, and in the case where it is determined that a resonant frequency has not occurred, the control unit 102 can determine that the electronic appliance 203 or the power reception device 2 to which the electronic appliance 203 is connected has been removed before completion of charging. In the case where it is determined that a resonant frequency has not occurred, it is determined that the electronic appliance 203 or the power reception device 2 to which the electronic appliance 203 is connected has been removed before completion of charging and the power transmission device 1 transitions to the first standby state 402 once again.

Whether charging has been completed is determined on the basis of the value of a current obtained by converting an alternating-current voltage value ACV detected by the alternating current voltmeter 106. For example, it may be determined that charging has been completed when the current has become smaller than a second threshold and it may be determined that some abnormality has occurred when the current has become larger than a first threshold. The control unit 102 determines that charging has been completed when the current has become smaller than the second threshold or determines that some abnormality has occurred when the current has become larger than the first threshold and transitions the power transmission device 1 to a second standby state 405, and the control unit 102 determines that charging is in progress when the current is higher than or equal to the second threshold and equal to or lower than the first threshold.

In addition, the control unit 102 may determine whether charging is in progress. In this case, the control unit 102 obtains the alternating-current voltage value ACV detected by the alternating current voltmeter 106, converts the obtained alternating-current voltage value ACV into a current and monitors the current obtained through this conversion. Whether charging is in progress is determined on the basis of whether for example the current has the same value for a fixed period of time. Whether the current has the same value may be determined using a magnitude relation between the current and predetermined thresholds as described above or may be determined by using the magnitude of a change in the current per unit time. For example, in the case where the determination is made using the magnitude of a change in the current per unit time, it is determined whether the current has changed by a predetermined amount within a unit time period, and in the case where it has not changed by the predetermined amount, it is determined that charging is in progress.

In the second standby state 405, charging has been completed or some abnormality has occurred and therefore it is not necessary for power to be transmitted to the power reception device 2. Accordingly, the control unit 102 reduces power supplied from the power supply 100 by transmitting a high impedance setting instruction to the impedance switching unit 108 such that a comparatively low voltage (second voltage) is supplied to the first active electrode 11a. Here, the voltage supplied to the first active electrode 11a is not limited to being the second voltage and may be a third voltage that is lower than the first voltage.

The control unit 102 obtains a direct current voltage value DCV detected by the I/V detector 101 and determines whether a resonant frequency has occurred by performing frequency sweeping at a fixed time interval (second time interval). In the case where it is determined that a resonant frequency has occurred, since the power reception device 2 is still mounted, a state of waiting until the electronic appliance 203 or the power reception device 2 to which the electronic appliance 203 is connected is removed continues. Here, it is preferable that the interval at which frequency sweeping is performed in the second standby state 405 (second time interval) be set to be longer than the interval at which frequency sweeping is performed in the first standby state 402 (first time interval). This is because charging has already finished or some abnormality has occurred and it is not necessary to restart transmission of power and power consumption can be reduced as much as possible. In the case where the control unit 102 determines that a resonant frequency has not occurred, the control unit 102 determines that the electronic appliance 203 or the power reception device 2 to which the electronic appliance 203 is connected has been removed and transitions the power transmission device 1 once again to the first standby state 402.

Figure 6:
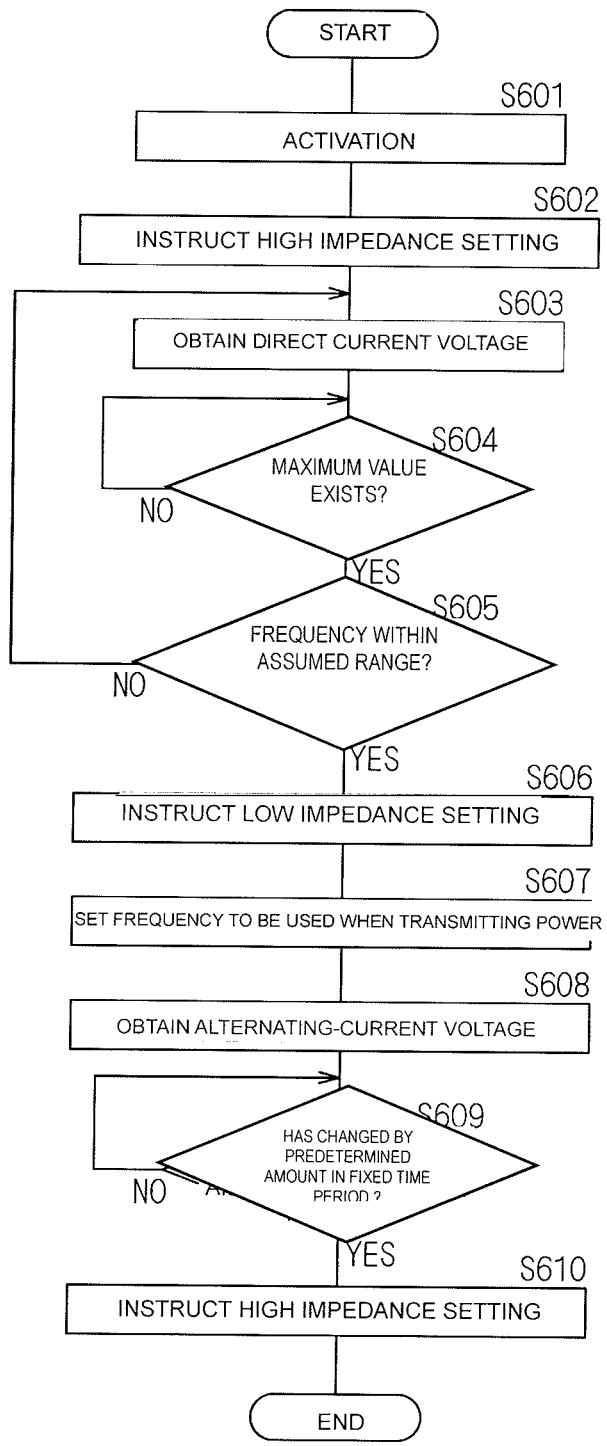
FIG. 6 is a flowchart illustrating a processing procedure of a control unit of the power transmission device according to embodiment 1 of the present invention.

FIG. 6 is a flowchart illustrating a processing procedure of the control unit 102 of the power transmission device 1 according to embodiment 1 of the present invention. In FIG. 6, the control unit 102 activates the power transmission device 1 after detecting that it has been for example plugged into a wall socket or connected to an A/C adapter (step S601), and then transmits a high impedance setting instruction to the impedance switching unit 108 (step S602). Thus, power supplied from the power supply 100 can be reduced.

The control unit 102 obtains a direct current voltage value DCV detected by the I/V detector 101 (step S603), and determines whether there is a maximum value for the direct current voltage value DCV by performing frequency sweeping at the first time interval (step S604). In a state in which the power reception device 2 is not mounted, a resonant frequency does not occur and therefore there is no maximum value for the obtained direct current voltage value DCV. Therefore, it is possible to determine whether the power reception device 2 is mounted in accordance with the presence/absence of a maximum value for the direct current voltage value DCV.

In the case where the control unit 102 determines that there is no maximum value for the direct current voltage value DCV (step S604: NO), the control unit 102 determines that the power reception device 2 is not mounted and enters a state of waiting until the power reception device 2 is mounted. Specifically, the frequency characteristics of the direct current voltage value DCV are analyzed by performing frequency sweeping at a fixed time interval (first time interval) until the power reception device 2 is mounted.

In the case where the control unit 102 determines that there is a maximum value for the direct current voltage value DCV (step S604: YES), the control unit 102 determines that the power reception device 2 has been mounted on the power transmission device 1 and determines whether a frequency at which the direct current voltage value DCV has the maximum value lies within a range assumed by the electronic appliance 203, which is a target of charging (step S605).

In the case where the control unit 102 determines that the frequency at which the direct current voltage value DCV has a maximum value does not lie within the range supposed by the electronic appliance 203, which is the target of charging (step S605: NO), the control unit 102 determines that the determination in step S604 was due to a simple erroneous operation or was due to connection of an electronic appliance that is not assumed to be the target of charging, and then returns the processing to step S603 and repeats the above-described processing.

In the case where the control unit 102 determines that the frequency at which the direct current voltage value DCV has a maximum value does lie within the range assumed by the electronic appliance 203 that is a target of charging (step S605: YES), the control unit 102 determines that the power reception device 2 to which the electronic appliance 203 that is a target of charging is connected is mounted, that is, the power reception device 2 that is a target of power transmission is mounted, and transmits a low impedance setting instruction to the impedance switching unit 108 (step S606) and sets an operation frequency to be used when transmitting power to be the frequency at which the direct current voltage value DCV has a maximum value (step S607). Thus, power supplied from the power supply 100 can be increased and transmission of power can be performed at a frequency at which the efficiency of transmission of power is highest.

The control unit 102 obtains an alternating-current voltage value ACV detected by the alternating current voltmeter 106 (step S608), converts the obtained alternating-current voltage value ACV into a current and monitors the current obtained through this conversion. The control unit 102 determines whether the current obtained through the conversion changes by a predetermined amount within a fixed time period (step S609). In the case where the control unit 102 determines that the current does not change by a predetermined amount (step S609: NO), the control unit 102 determines that charging is in progress and enters a state of waiting until the charging is complete. In the case where the control unit 102 determines that the current has changed by a predetermined amount, that is, the current has decreased by a predetermined amount or increased by a predetermined amount within a fixed time period (step S609: YES), the control unit 102 determines that charging is complete or that some abnormality has occurred and transmits a high impedance setting instruction to the impedance switching unit 108 such that a comparatively low voltage (second voltage) is supplied to the first active electrode 11a (step S610). Thus, the power supplied from the power supply 100 can be reduced and the direct current voltage value DCV becomes small.

According to the above-described embodiment 1, along with the power supply circuit 12 supplying the first voltage to the first active electrode 11a when power transmission is performed, the power supply circuit 12 supplies the second voltage that is lower than the first voltage to the first active electrode 11a and frequency sweeping is performed at a first time interval until the power reception device 2 is mounted when detection of whether the power reception device 2 is mounted is being performed, and the power supply circuit 12 supplies the second voltage that is lower than the first voltage to the first active electrode 11a and frequency sweeping is performed at the second time interval which is longer than the first time interval until the power reception device 2 is removed when determination of whether charging has been completed is being performed. Thus, at times other than when power is transmitted, the voltage applied to the first active electrode 11a can be reduced and therefore power consumption can be reduced. In addition, in the case where the power reception device 2 is not mounted, a voltage supplied to the first active electrode 11a is low and therefore dangers such as conduction of a current occurring due to something contacting the power transmission device 1 can be avoided and a safe power transmission device 1 and power transmission control method can be provided.

Embodiment 2

Since the configuration of a power transmission system that employs a power transmission device according to embodiment 2 of the present invention is the same as that of embodiment 1, the same symbols will be used and therefore detailed description of the configuration will not be given. Embodiment 2 differs from embodiment 1 in that, in the power transmission state 404, in the case where it is determined that some abnormality has occurred, the power transmission device 1 is transitioned to the second standby state 405 and in the case where it is determined that charging has been completed, the power transmission device 1 is transitioned to a new third standby state.

Figure 7:
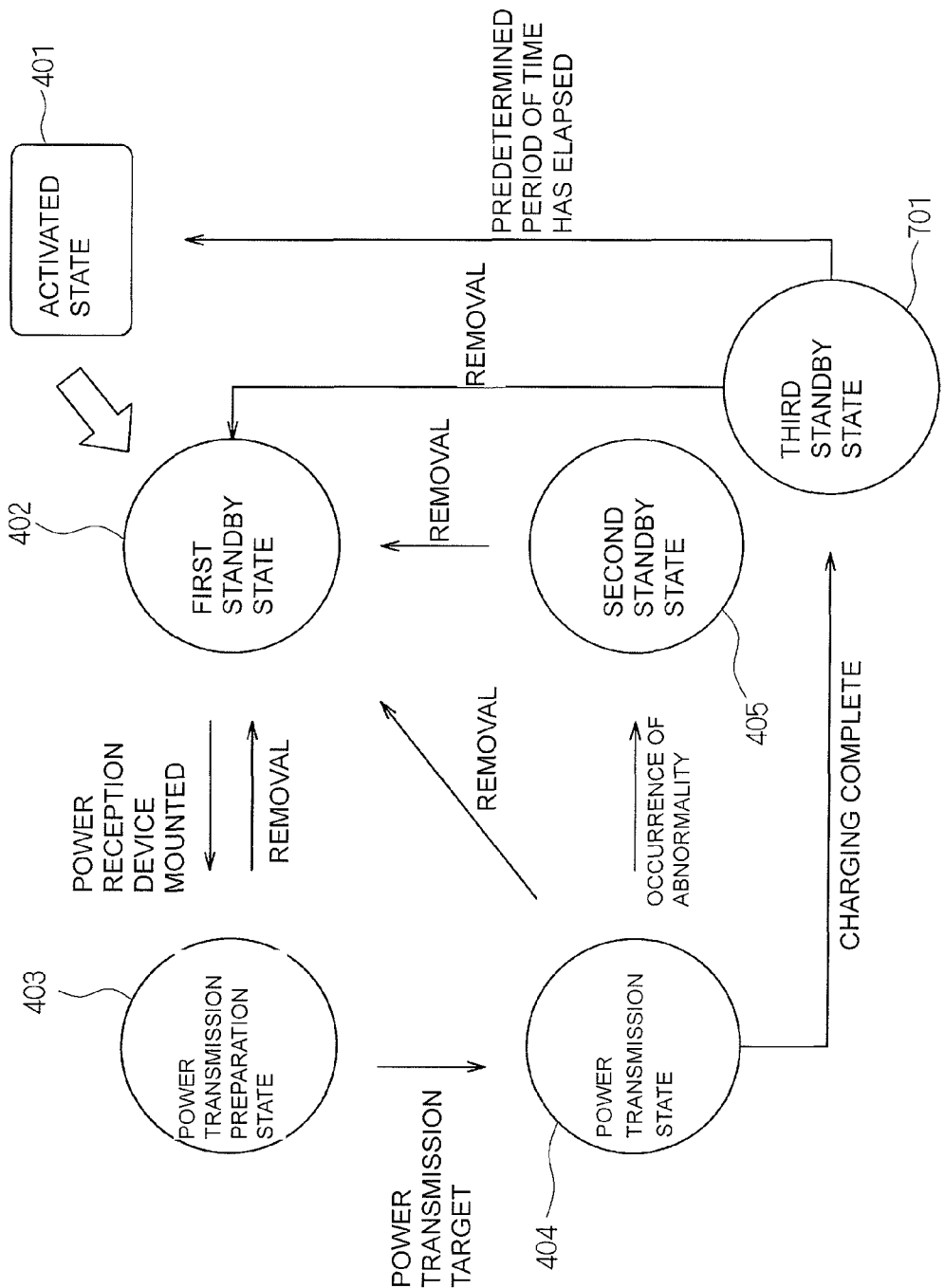
FIG. 7 is a schematic diagram illustrating state transitions of a power transmission device according to embodiment 2 of the present invention.

FIG. 7 is a schematic diagram illustrating state transitions of the power transmission device 1 according to embodiment 2 of the present invention. As illustrated in FIG. 7, the power transmission device 1 is activated by for example being plugged into a wall socket or being connected to an A/C adapter (activated state 401). The power transmission device 1 transitions to a first standby state 402 immediately after being activated. In the first standby state 402, the control unit 102 reduces the power supplied from the power supply 100 by transmitting a high impedance setting instruction to the impedance switching unit 108 such that a comparatively low voltage (second voltage) is supplied to the first active electrode 11a.

The control unit 102 obtains a direct current voltage value DCV detected by the I/V detector 101 and determines whether a resonant frequency has occurred by performing frequency sweeping at a fixed time interval (first time interval) (mounting determination means). Since the resonant frequency does not occur in a state where the power reception device 2 is not mounted, a state of waiting continues until a resonant frequency occurs, that is, until the power reception device 2 is mounted. In the case where the control unit 102 determines that a resonant frequency has occurred, the control unit 102 determines that the power reception device 2 has been mounted and transitions the power transmission device 1 to a power transmission preparation state 403 from the first standby state 402.

In the power transmission preparation state 403, having determined that a resonant frequency has occurred, the control unit 102 then determines whether this was due to a simple erroneous operation, due to an electronic appliance that is assumed to not be a charging target being connected to the power reception device 2, or due to the electronic appliance 203 which is the target of charging being connected to the power reception device 2. That is, it is recognized whether the mounted power reception device 2 is the power reception device 2 that is a target to which power is to be transmitted (recognition means). Specifically, it can be determined whether the frequency at which the direct current voltage value DCV has a maximum value lies within a range assumed by the electronic appliance 203 which is the target of charging.

In the case where it is determined that the determination was due to a simple erroneous operation or connection of an electronic appliance assumed not to be a target of charging, a state of waiting continues in the power transmission preparation state 403 until the power reception device 2, to which the electronic appliance 203 which is a target of charging is connected, is mounted. In addition, similarly to as in the first standby state 402, the control unit 102 obtains a direct current voltage value DCV detected by the I/V detector 101 and determines whether a resonant frequency has occurred by performing frequency sweeping at a fixed time interval, and in the case where it is determined that a resonant frequency has not occurred, it is determined that an electronic appliance that has generated an erroneous operation, an electronic appliance that is assumed not to be a target of charging or the electronic appliance 203 that is a target of charging has been removed from the power reception device 2 or it is determined that the power reception device 2 itself has been removed and the control unit 102 transitions the power transmission device 1 to the first standby state 402 once again.

In the case where the control unit 102 determines that the power reception device 2 that is the target of power transmission is mounted, that is, the power reception device 2, to which the electronic appliance 203 that is a target of charging is connected, is mounted, the control unit 102 transitions the power transmission device 1 to the power transmission state 404 and initiates transmission of power to the power reception device 2. Specifically, the control unit 102 causes power supplied from the power supply 100 to be increased by transmitting a low impedance setting instruction to the impedance switching unit 108 such that a comparatively high voltage (first voltage) is supplied to the first active electrode 11a and transmits a power transmission initiation instruction to the driving control unit 103.

In the power transmission state 404 as well, similarly to as in the first standby state 402, the control unit 102 obtains a direct current voltage value DCV detected by the I/V detector 101 and determines whether a resonant frequency has occurred by performing frequency sweeping at a fixed interval, and in the case where it is determined that a resonant frequency has not occurred, the control unit 102 can determine that the electronic appliance 203 or the power reception device 2 to which the electronic appliance 203 is connected has been removed before completion of charging. In the case where it is determined that a resonant frequency has not occurred, it is determined that the electronic appliance 203 or the power reception device 2 to which the electronic appliance 203 is connected has been removed before completion of charging and the power transmission device 1 transitions to the first standby state 402 once again.

Whether charging has been completed is determined on the basis of the value of a current obtained by converting an alternating-current voltage value ACV detected by the alternating current voltmeter 106. For example, it may be determined that charging has been completed when the current has become smaller than a second threshold and it may be determined that some abnormality has occurred when the current has become larger than a first threshold. The control unit 102 determines that charging has been completed when the current has become smaller than the second threshold and transitions the power transmission device 1 to a third standby state 701, determines that some abnormality has occurred when the current has become larger than the first threshold and transitions the power transmission device 1 to the second standby state 405, and determines that charging is in progress when the current is higher than or equal to the second threshold and equal to or lower than the first threshold.

In addition, the control unit 102 may also determine whether charging is in progress. In this case, the control unit 102 obtains the alternating-current voltage value ACV detected by the alternating current voltmeter 106, converts the obtained alternating-current voltage value ACV into a current and monitors the current obtained through this conversion. Whether charging is in progress is determined on the basis of whether for example the current has the same value for a fixed period of time. Whether the current has the same value may be determined using a magnitude relation between the current and predetermined thresholds as described above or may be determined by using the magnitude of a change in the current per unit time. For example, in the case where the determination is made using the magnitude of a change in the current per unit time, it is determined whether the current has changed by a predetermined amount within a unit time period, and in the case where it has not changed by the predetermined amount, it is determined that charging is in progress. In the case where it is determined that charging is not in progress, the determination is made using a magnitude relation between the current and the first and second thresholds as described above.

In the case where the current is larger than the first threshold, the control unit 102 determines that some abnormality has occurred and transitions the power transmission device 1 to the second standby state 405. In the second standby state 405, since some abnormality has occurred, it is not necessary to transmit power to the power reception device 2. Accordingly, the control unit 102 reduces power supplied from the power supply 100 by transmitting a high impedance setting instruction to the impedance switching unit 108 such that a comparatively low voltage (second voltage) is supplied to the first active electrode 11a. Here, the voltage supplied to the first active electrode 11a is not limited to being the second voltage and may be a third voltage that is lower than the first voltage.

The control unit 102 obtains a direct current voltage value DCV detected by the I/V detector 101 and determines whether a resonant frequency has occurred by performing frequency sweeping at a fixed time interval (second time interval). In the case where it is determined that a resonant frequency has occurred, since the power reception device 2 is still mounted, a state of waiting until the electronic appliance 203 or the power reception device 2 to which the electronic appliance 203 is connected is removed continues. Here, it is preferable that the interval at which frequency sweeping is performed in the second standby state 405 (second time interval) be set to be longer than the interval at which frequency sweeping is performed in the first standby state 402 (first time interval). This is because some abnormality has occurred and it is not necessary to restart transmission of power and power consumption can be reduced as much as possible. In the case where the control unit 102 determines that a resonant frequency has not occurred, the control unit 102 determines that the electronic appliance 203 or the power reception device 2 to which the electronic appliance 203 is connected has been removed and transitions the power transmission device 1 once again to the first standby state 402.

In addition, in the case where the current has become smaller than the second threshold, the control unit 102 determines that charging has been completed and transitions the power transmission device 1 to the third standby state 701. In the third standby state 701, it is not necessary to transmit power to the power reception device 2 because charging has been completed. Accordingly, the control unit 102 reduces power supplied from the power supply 100 by transmitting a high impedance setting instruction to the impedance switching unit 108 such that a comparatively low voltage (second voltage) is supplied to the first active electrode 11a.

The control unit 102 obtains a direct current voltage value DCV detected by the I/V detector 101 and determines whether a resonant frequency has occurred by performing frequency sweeping at a fixed time interval (second time interval). In the case where it is determined that a resonant frequency has occurred, since the power reception device 2 is still mounted, a state of waiting until the electronic appliance 203 or the power reception device 2 to which the electronic appliance 203 is connected is removed continues. Here, it is preferable that the interval at which frequency sweeping is performed in the third standby state 701 (second time interval) be set to be longer than the interval at which frequency sweeping is performed in the first standby state 402 (first time interval). This is because charging has already been completed, it is not necessary to restart transmission of power and power consumption can be reduced as much as possible. In the case where the control unit 102 determines that a resonant frequency has not occurred, the control unit 102 determines that the electronic appliance 203 or the power reception device 2 to which the electronic appliance 203 is connected has been removed and transitions the power transmission device 1 once again to the first standby state 402.

In addition, in the case where the control unit 102 is waiting in the third standby state 701, the control unit 102 returns the power transmission device 1 to the activated state 401 every predetermined time period, for example, every two hours. If there is no third standby state 701 as in embodiment 1, a situation may occur in which the power reception device 2 becomes unable to be used due to naturally discharging if charging has been performed once but is then not restarted when the power reception device 2 has been left in a mounted state. In contrast, in embodiment 2, in the third standby state 701, since the power transmission device 1 can be returned to the activated state 401 after a predetermined time period has elapsed, a charged state can be maintained even when someone has forgot to remove the power reception device 2 from the power transmission device 1.

Figure 8:
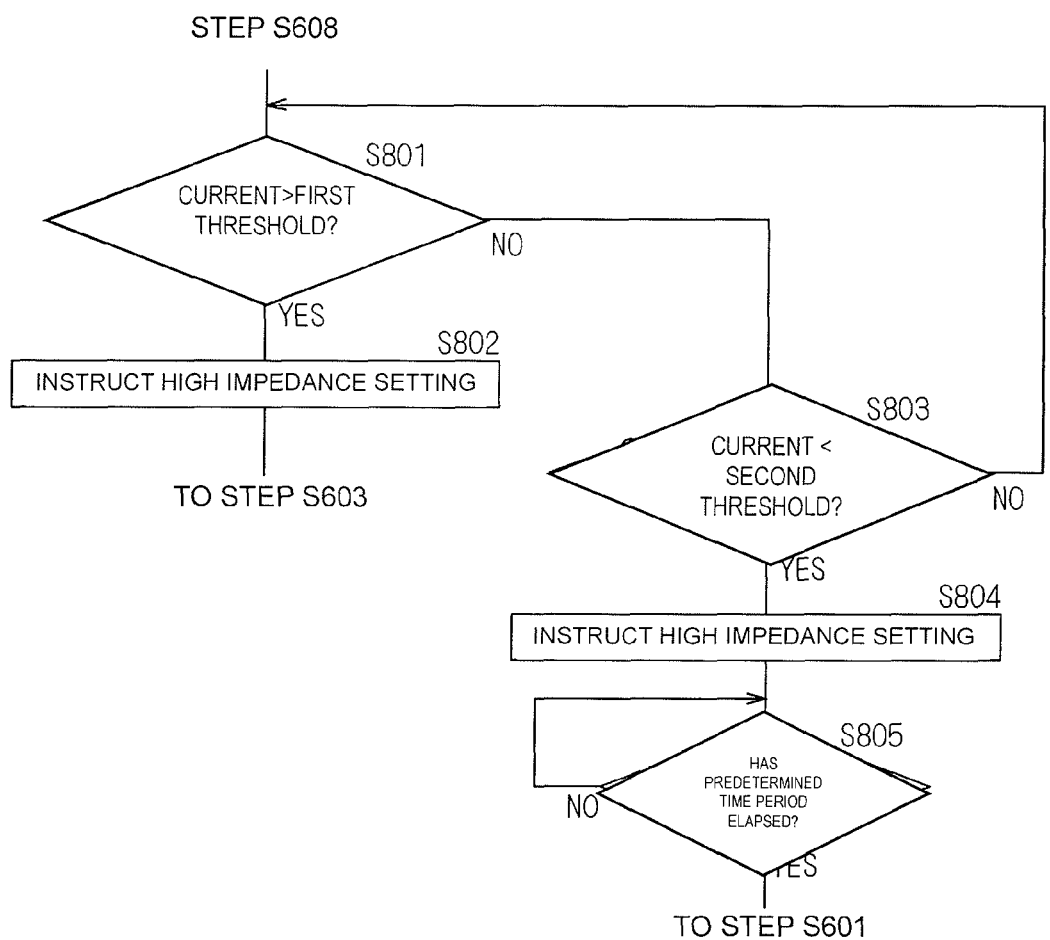
FIG. 8 is a flowchart illustrating a processing procedure of a control unit of the power transmission device according to embodiment 2 of the present invention.

FIG. 8 is a flowchart illustrating a processing procedure of the control unit 102 of the power transmission device 1 according to embodiment 2 of the present invention. In FIG. 8, since the processing from step S601 to step S608 is the same as in embodiment 1, detailed description thereof is omitted. The control unit 102 of the power transmission device 1 obtains an alternating-current voltage value ACV detected by the alternating current voltmeter 106 (step S608), converts the obtained alternating-current voltage value ACV into a current and monitors the current obtained through this conversion. The control unit 102 determines whether the current obtained through this conversion is larger than the first threshold (step S801).

In the case where the control unit 102 determines that the current is larger than the first threshold (step S801: YES), the control unit 102 determines that some abnormality has occurred during the charging and transmits a high impedance setting instruction to the impedance switching unit 108 such that a comparatively low voltage (second voltage) is applied to the first active electrode 11a (step S802). Thus, power supplied from the power supply 100 can be reduced. The control unit 102 returns the processing to step S603 and repeats the above-described processing.

In the case where the control unit 102 determines that the current is equal to or less than the first threshold (step S801: NO), the control unit 102 determines whether the current is smaller than the second threshold (step S803). In the case where the control unit 102 determines that the current is equal to or higher than the second threshold (step S803: NO), the control unit 102 determines that charging is not complete and returns the processing to step S801 and repeats the above-described processing. In the case where the control unit 102 determines that the current is smaller than the second threshold (step S803: YES), the control unit 102 determines that charging is complete and transmits a high impedance setting instruction to the impedance switching unit 108 such that a comparatively low voltage (second voltage) is applied to the first active electrode 11a (step S804). Thus, power supplied from the power supply 100 can be reduced.

The control unit 102 determines whether a predetermined time period has elapsed (step S805). In the case where the control unit 102 determines that the predetermined time period has not elapsed (step S805: NO), the control unit 102 determines that the charged power still remains and enters a waiting state. In the case where the control unit 102 determines that the predetermined period of time has elapsed (step S805: YES), the control unit 102 determines that the charged power has been discharged, returns the processing to step S601 and repeats the above-described processing.

According to the above-described embodiment 2, since the second standby state 405 is transitioned to in the case where it is determined that some abnormality has occurred in the power transmission state 404, the third standby state 701 is transitioned to in the case it is determined that charging is complete, and the activated state 401 is returned to when a predetermined period of time has elapsed in the third standby state 701, a charged state can be maintained even when the power reception device 2 for which charging has been completed is left mounted on the power transmission device 1.

Embodiment 3

Since the configuration of a power transmission system that employs a power transmission device according to embodiment 3 of the present invention is the same as that of embodiments 1 and 2, the same symbols are used and therefore detailed description of the configuration will not be given. Embodiment 3 differs from embodiments 1 and 2 in that the power transmission device 1 and the power reception device 2 communicate with each other and as a result power is transmitted at an operation frequency that is appropriate for the power reception device 2.

Figure 9:
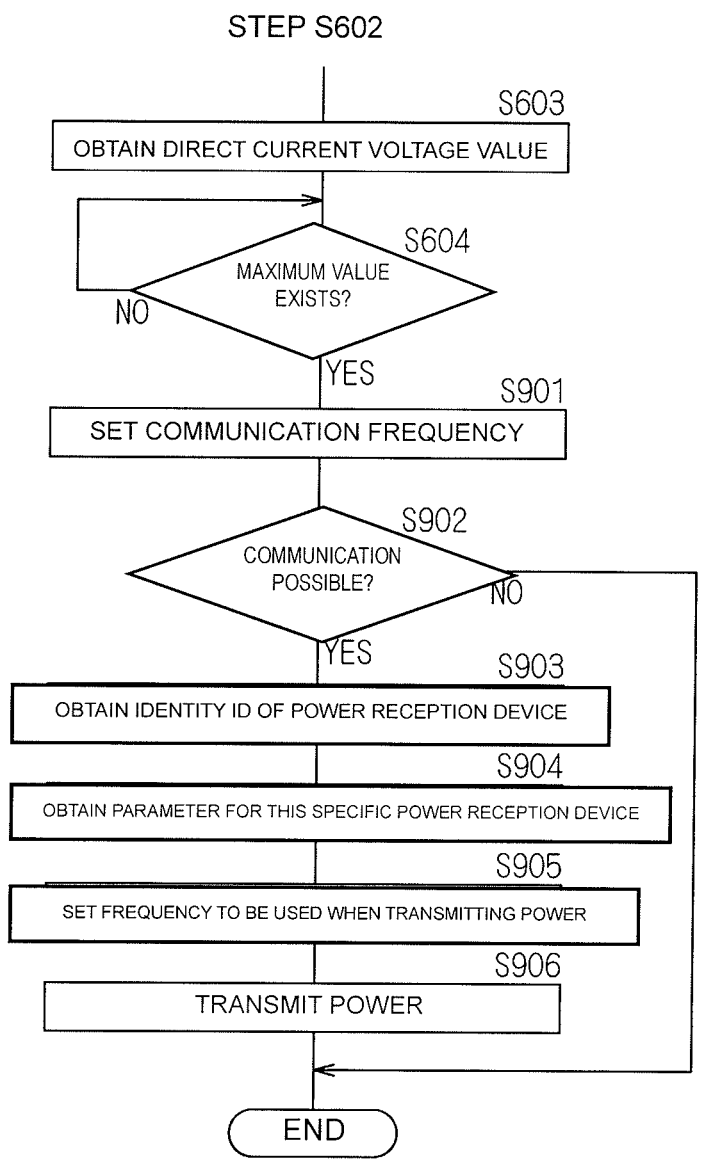
FIG. 9 is a flowchart illustrating a processing procedure of a control unit of a power transmission device according to embodiment 3 of the present invention.
Figure 10:
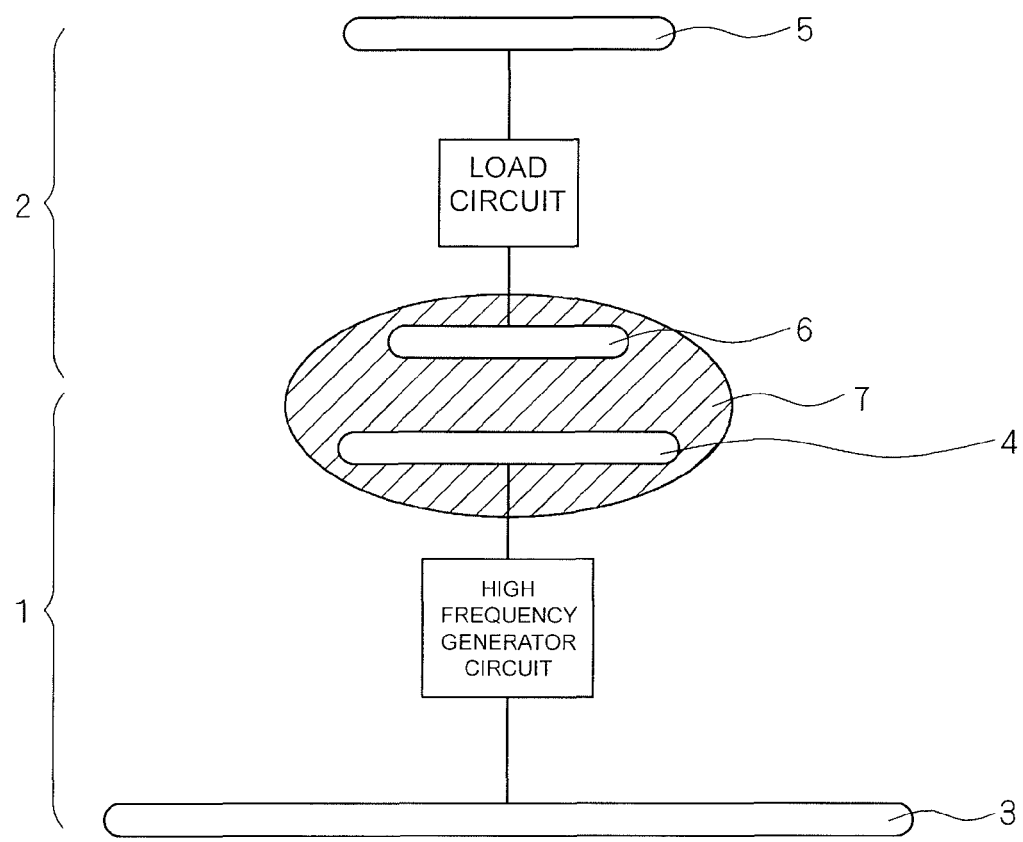
FIG. 10 is a schematic diagram that illustrates a configuration of a power transmission system of the related art.

FIG. 9 is a flowchart illustrating a processing procedure of the control unit 102 of the power transmission device 1 according to embodiment 3 of the present invention. In FIG. 9, since the processing of step S601 and step S602 is the same as that in embodiment 1, detailed description thereof is omitted. Here, it is preferable that the high impedance value that is instructed to be set in step S602 be higher than in embodiments 1 and 2, that is, it is preferable that power supplied from the power supply 100 be further reduced.

The control unit 102 transmits a high impedance setting instruction to the impedance switching unit 108 (step S602). Thus, power supplied from the power supply 100 can be reduced. The high impedance value whose setting has been instructed is made high such that the direct current voltage value DCV supplied from the power supply circuit 12 becomes smaller than the direct current voltage value DCV in the first standby state 402 which is transitioned to immediately after activation of the power transmission device 1. Thus, a fourth voltage is supplied to the first active electrode 11a of the power transmission device 1, the fourth voltage being lower than the second voltage used when determination of whether the power reception device 2 is mounted is being performed in the first standby state 402. This is because it is sufficient to supply just enough power to perform data communication.

The control unit 102 obtains a direct current voltage value DCV detected by the I/V detector 101 (step S603), and determines whether there is a maximum value for the direct current voltage value DCV by performing frequency sweeping at the first time interval (step S604). In a state in which the power reception device 2 is not mounted, a resonant frequency does not occur and therefore there is no maximum value for the obtained direct current voltage value DCV. Therefore, it is possible to determine whether the power reception device 2 is mounted in accordance with the presence/absence of a maximum value for the direct current voltage value DCV.

In the case where the control unit 102 determines that there is no maximum value for the direct current voltage value DCV (step S604: NO), the control unit 102 determines that the power reception device 2 is not mounted and enters a state of waiting until the power reception device 2 is mounted. Specifically, the frequency characteristics of the direct current voltage value DCV are analyzed by performing frequency sweeping at a fixed time interval (first time interval) until the power reception device 2 is mounted.

In the case where the control unit 102 determines that there is a maximum value for the direct current voltage value DCV (step S604: YES), the control unit 102 determines that the power reception device 2 is mounted on the power transmission device 1 and sets a communication frequency to be used when communicating with the mounted power reception device 2 (step S901).

The control unit 102 determines whether communication of data with the power reception device 2 is possible (step S902), and in the case where the control unit 102 determines that communication of data is not possible (step S902: NO), the control unit 102 determines that the mounted device is not the power reception device 2 which is a target to which power is to be transmitted and finishes the processing. In the case where the control unit 102 determines that communication of data is possible (step S902: YES), the control unit 102 obtains a identity ID of the power reception device 2 (step S903).

When the control unit 102 can obtain the identity ID, the control unit 102 can confirm that the power reception device 2 which is the target of power transmission is mounted, and therefore the control unit 102 obtains a parameter necessary for reception of power for this specific power reception device 2 by performing data communication with the power reception device 2 corresponding to the obtained identity ID (step S904), performs setting on the basis of the obtained parameter so as to specify the operation frequency to be used when transmitting power (step S905) and then transmits power to the power reception device 2 (step S906).

The method of communicating data in order to obtain the parameter necessary for power reception for the specific power reception device 2 is not particularly limited and for example data may be communicated by a load modulation method. In this case, the operation frequency to be used when transmitting power can be specified on the basis of the obtained parameter.

According to the above-described embodiment 3, an identity ID that identifies the power reception device 2 is obtained as a result of the power transmission device 1 and the power reception device 2 communicating data with each other, whereby it can be determined that the power reception device 2, which is a target to which power is to be transmitted, is mounted. In addition, since it is possible to recognize what power reception device 2 had been mounted by using the parameter necessary in reception of power for the specific power reception device 2, the operation frequency to be used when transmitting power can be appropriately specified. Therefore, power can be efficiently transmitted.

In other respects, it goes without saying that the present invention is not limited to the above-described embodiments and various modifications and substitutions are possible within the scope of the gist of the present invention.

REFERENCE SIGNS LIST

1 power transmission device
2 power reception device
11a first active electrode
11p first passive electrode
12 high frequency generator circuit (power supply circuit)
21a second active electrode
21p second passive electrode
100 power supply
102 control unit

The invention claimed is:
1. A power transmission device comprising:
an active electrode configured to face an active electrode of a power reception device when the power reception device is positioned adjacent the power transmission device, such that the respective active electrodes are capacitively coupled with each other;
a passive electrode configured to face a passive electrode of the power reception device when the power reception device is adjacent to the power transmission device, such that the respective passive electrodes are capacitively coupled with each other;
a power reception device detector configured to detect whether the power reception device is adjacent to the power transmission device;
a charging state monitor configured to monitor a charging state of the power reception device; and
a power supply circuit configured to supply power based on the charging state of the power reception device, wherein the power supply circuit supplies a first voltage to the first active electrode when the power reception device is in a first charging state, wherein the power supply circuit supplies a second voltage, which is lower than the first voltage, to the first active electrode when the power reception device detector does not detect the power reception device, wherein the power supply circuit supplies a third voltage, which is lower than the first voltage, to the first active electrode when the power reception device is in a second charging state, wherein, when the power supply circuit supplies the second voltage to the first active electrode, the power reception device detector performs a frequency sweep at a first time interval until the power reception device detector detects the power reception device, and wherein, when the power supply circuit supplies the third voltage to the first active electrode, the power reception device detector performs a frequency sweep at a second time interval, which is longer than the first time interval, until the power reception device detector does not detect the power reception device.

2. The power transmission device according to claim 1, wherein the power transmission device is configured to transmit power in a noncontact manner by forming a stronger electric field between the respective active electrodes than between the respective passive electrodes.

3. The power transmission device according to claim 2, wherein the power transmission device is configured to obtain a parameter necessary for power reception for the power reception device by data communication with the power reception device using load modulation and to determine a frequency to transmit power based on the obtained parameter.

4. The power transmission device according to claim 1, wherein, when the power reception device detector performs the frequency sweep at the first time interval to detect the power reception device, the power reception device detector measures frequency characteristics of a voltage by performing the frequency sweep in a predetermined frequency range to detect that the power reception device is adjacent to the power transmission device upon detecting a resonant frequency.

5. The power transmission device according to claim 4, wherein the power reception device detector is configured to detect that the power reception device is adjacent to the power transmission device upon detecting that the frequency characteristics of the voltage have a maximum value.

6. The power transmission device according to claim 1, wherein the charging state monitor is configured to monitor a current output to the passive electrode and the active electrode of the power transmission device and to determine whether the power reception device is in the second charging state based on the current.

7. The power transmission device according to claim 6, wherein the charging state monitor is configured to monitor a magnitude relation between the current, a first threshold and a second threshold that is smaller than the first threshold, and wherein the power reception device detector determines that an abnormality has occurred when the current is larger than the first threshold and determines that charging of the power reception device is complete when the current is smaller than the second threshold.

8. The power transmission device according to claim 1, further comprising:

a control unit configured to determine whether the detected power reception device is a target device to which power is to be transmitted, wherein the control unit is configured to set a frequency sampling interval used when performing a frequency sweep until the control unit detects a recognition result shorter than the frequency sampling interval.

9. The power transmission device according to claim 8, wherein the power supply circuit supplies a fourth voltage, which is lower than the second voltage, to the first active electrode, and wherein the control unit recognizes that the power reception device is a target device to which power is to be transmitted upon obtaining identification information that identifies the power reception device.

10. A method of transmitting power from a power transmission device having a first passive electrode and a first active electrode to a power reception device having a second passive electrode and a second active electrode, such that the respective active electrodes and the respective passive electrodes are capacitively coupled with each other when the power reception device is positioned adjacent to the power transmission device, the method comprising:

detecting whether the power reception device is positioned adjacent to the power transmission device;

monitoring a charging state of the power reception device;

supplying a first voltage to the first active electrode when the power reception device is in a first charging state;

supplying a second voltage, which is lower than the first voltage, to the first active electrode when the power reception device is not detected; and supplying a third voltage, which is lower than the first voltage, to the first active electrode when the power reception device is in a second charging state, wherein, during the supplying of the second voltage to the first active electrode, the method further comprises performing a frequency sweep at a first time interval until the power reception device is detected, and wherein, during the supplying of the third voltage to the first active electrode, the method further comprises performing a frequency sweep at a second time interval, which is longer than the first time interval, until the power reception device is not detected.

11. The method of transmitting power according to claim 10, further comprising transmitting power in a noncontact manner by forming a stronger electric field between the respective active electrodes than between the respective passive electrodes.

12. The method of transmitting power according to claim 11, further comprising:

obtaining a parameter necessary for power reception for the power reception device by communicating data with the power reception device using a load modulation method; and determining a frequency to transmit power based on the obtained parameter.

13. The method of transmitting power according to claim 10, further comprising:

during the frequency sweep at the first time interval, measuring frequency characteristics of a voltage by performing the frequency sweeping in a predetermined frequency range; and determining that the power reception device is positioned adjacent to the power transmission device upon detecting a resonant frequency.

14. The method of transmitting power according to claim 13, further comprising detecting that the power reception device is adjacent to the power transmission device upon detecting that the frequency characteristics of the voltage have a maximum value.

15. The method of transmitting power according to claim 10, further comprising:
  monitoring a current output to the first passive electrode and the first active electrode; and
  determining whether the power reception device is in the second charging state based on the current.

16. The method of transmitting power according to claim 15, further comprising:
  monitoring a magnitude relation between the current, a first threshold and a second threshold that is smaller than the first threshold;
  determining that an abnormality has occurred when the current is larger than the first threshold; and
  determining that charging of the power reception device is complete when the current is smaller than the second threshold.

17. The method of transmitting power according to claim 10 further comprising:
  recognizing whether the detected power reception device is a power reception device that is a target device to which power is to be transmitted; and
  setting a frequency sampling interval used when performing a frequency sweep until a recognition result is output that is shorter than the frequency sampling interval.

18. The method of transmitting power according to claim 10, further comprising:
  supplying a fourth voltage, which is lower than the second voltage, to the first active electrode; and
  recognizing that the power reception device is a target device to which power is to be transmitted upon obtaining identification information that identifies the power reception device.

* * * * *